US012535569B2

(12) United States Patent
Kumar et al.

(10) Patent No.: US 12,535,569 B2
(45) Date of Patent: Jan. 27, 2026

(54) METHOD AND SYSTEM FOR LOCALIZATION OF TARGETS USING SFCW MIMO RADAR

(71) Applicant: Tata Consultancy Services Limited, Mumbai (IN)

(72) Inventors: Achanna Anil Kumar, Bangalore (IN); Krishna Kanth Rokkam, Bangalore (IN); Tapas Chakravarty, Kolkata (IN); Arpan Pal, Kolkata (IN); Andrew Gigie, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 289 days.

(21) Appl. No.: 18/465,786

(22) Filed: Sep. 12, 2023

(65) Prior Publication Data

US 2024/0280678 A1    Aug. 22, 2024

(30) Foreign Application Priority Data

Feb. 16, 2023   (IN) .............................. 202321010526

(51) Int. Cl.
  *G01S 13/00*   (2006.01)
  *G01S 7/35*    (2006.01)
  *G01S 13/42*   (2006.01)

(52) U.S. Cl.
  CPC ............ *G01S 13/006* (2013.01); *G01S 7/352* (2013.01); *G01S 13/42* (2013.01)

(58) Field of Classification Search
  CPC ........ G01S 13/006; G01S 7/352; G01S 13/42; G01S 3/46; G01S 3/74; G01S 13/38; G01S 13/584; G06F 17/141

(Continued)

(56) References Cited

U.S. PATENT DOCUMENTS

| | | | | |
|---|---|---|---|---|
| 6,311,043 B1 * | 10/2001 | Haardt | ................ | H04B 7/0854 |
| | | | | 342/453 |
| 6,353,731 B1 * | 3/2002 | Haardt | ................ | H04B 17/309 |
| | | | | 370/347 |

(Continued)

FOREIGN PATENT DOCUMENTS

| | | | | |
|---|---|---|---|---|
| CN | 112630766 A | 4/2021 | | |
| EP | 3179266 A1 * | 6/2017 | ............. | G01S 13/42 |

(Continued)

OTHER PUBLICATIONS

Li, Da-Peng et al., "Application of Esprit Methodto Stepped Frequency Radar Forscattering Centre Extraction", Title of the item: 2009 IET International Radar Conference, Date: 2009, Publisher: IET.

*Primary Examiner* — Nuzhat Pervin

(74) *Attorney, Agent, or Firm* — FINNEGAN, HENDERSON, FARABOW, GARRETT & DUNNER LLP

(57) ABSTRACT

Conventional ESPRIT (Estimation of Signal Parameters via Rational Invariance Techniques) cannot be directly applied to SFCW MIMO radar for localization of targets as the performance would be restricted by geometry of spatial MIMO. Thus, the present disclosure provides a method and system for localization of targets using SFCW MIMO radar. In this method, the channel response of the virtual uniform rectangular array (vURA) obtained by scanning at uniformly spaced frequency points is combined to form a larger array referred as Space-Frequency (SF) array. The 3D localization of targets is done by estimating azimuth angle, elevation angle and range using this SF array. The localization capability of the disclosed method largely depends upon the number of frequency scanning points and enables localizing far more targets than the dimension of the vURA. In (Continued)

addition, the inter-element spacing requirement of vURA is also greatly relaxed.

15 Claims, 8 Drawing Sheets

(58) Field of Classification Search
USPC .......................................................... 342/128
See application file for complete search history.

(56) References Cited

U.S. PATENT DOCUMENTS

| | | | | |
|---|---|---|---|---|
| 7,652,616 B2 * | 1/2010 | Inaba | ................... | G01S 13/931 |
| | | | | 342/112 |
| 7,714,782 B2 * | 5/2010 | Davis | ................... | H01Q 21/22 |
| | | | | 342/99 |
| 9,814,037 B2 * | 11/2017 | Xue | ................... | H04L 12/18 |
| 10,141,657 B2 * | 11/2018 | Kishigami | ............... | G01S 13/26 |
| 10,942,268 B2 * | 3/2021 | Lida | ................... | G01S 13/42 |
| 10,972,172 B2 * | 4/2021 | Krunz | ................ | H04B 7/06952 |
| 12,306,334 B2 * | 5/2025 | Zhao | ................... | G01S 7/354 |
| 12,320,923 B2 * | 6/2025 | Foreman | ................ | G01S 7/415 |
| 2005/0195103 A1 * | 9/2005 | Davis | ................... | H01Q 21/22 |
| | | | | 342/158 |
| 2007/0285315 A1 * | 12/2007 | Davis | ................... | H01Q 21/22 |
| | | | | 342/377 |
| 2016/0131752 A1 * | 5/2016 | Jansen | ................... | G01S 13/42 |
| | | | | 342/27 |
| 2017/0315221 A1 * | 11/2017 | Cohen | ................... | G01S 13/42 |
| 2018/0348357 A1 * | 12/2018 | Pandey | ................... | G01S 3/32 |
| 2020/0103495 A1 * | 4/2020 | Iwasa | ................... | G01S 13/343 |
| 2020/0150256 A1 * | 5/2020 | Dent | ................... | G01S 13/42 |
| 2021/0270933 A1 * | 9/2021 | Hakobyan | ............... | G01S 7/354 |
| 2021/0270937 A1 * | 9/2021 | Hakobyan | ............... | G01S 7/354 |
| 2022/0099837 A1 * | 3/2022 | Crouch | ................... | G01S 13/931 |
| 2022/0163623 A1 * | 5/2022 | Kishigami | ............ | G01S 13/288 |
| 2022/0413120 A1 * | 12/2022 | Va | ........................... | G01S 13/42 |
| 2024/0183941 A1 * | 6/2024 | Maher | ................... | G01S 13/931 |
| 2024/0230871 A1 * | 7/2024 | Muñoz | ................... | G01S 13/42 |
| 2025/0028022 A1 * | 1/2025 | Hassibi | ................... | G01S 7/527 |

FOREIGN PATENT DOCUMENTS

| | | | | | |
|---|---|---|---|---|---|
| EP | | 3762742 B1 * | 11/2023 | ............. | G01S 7/282 |
| EP | | 4361674 B1 * | 1/2025 | ............... | G01S 7/41 |
| WO | WO-2016045938 A1 * | | 3/2016 | ............... | G01S 13/42 |
| WO | WO-2022117502 A1 * | | 6/2022 | ........... | G01S 7/4004 |

* cited by examiner

METHOD AND SYSTEM FOR LOCALIZATION OF TARGETS USING SFCW MIMO RADAR

PRIORITY CLAIM

This U.S. patent application claims priority under 35 U.S.C. § 119 to: Indian Patent Application No. 202321010526, filed on Feb. 16, 2023. The entire contents of the aforementioned application are incorporated herein by reference.

TECHNICAL FIELD

The disclosure herein generally relates to the field of radar systems, and, more particularly, to method and system for localization of targets using Stepped Frequency Continuous Wave Multi-Input Multi-Output (SFCW MIMO) radar.

BACKGROUND

Of late, Ultra-Wide Band (UWB) Multiple-Input Multiple-Output (MIMO) radars equipped with co-located antennas, particularly in the millimetre Wave (mmWave) band i.e., at 60 GHz, 77 GHz etc., is gaining lot of popularity. This is because it has applications in several areas including biomedical, automotive, indoor localization and tracking, human computer interface among several others. Both Frequency Modulated Continuous Wave (FMCW) MIMO and Stepped Frequency Continuous Wave (SFCW) MIMO radars are available commercially in the market. While both these radars have an advantage of requiring lesser rate Analog-to-Digital-Converters (ADCs) as compared to a UWB impulse radar, calibration in FMCW radars is more difficult. Hence nowadays SFCW radars are being preferred in several applications. One such application is 3D localization of multiple point targets distributed in space by estimating azimuth angle, elevation angle and range of the targets.

In literature, several approaches for 3D localization with SFCW MIMO radar exists. One of the popular approaches is deterministic methods which are mainly based on Discrete Fourier Transform (DFT) and standard beamforming. Few other approaches are based on statistical methods such as MUSIC ((Multiple Signal Classification), and ESPRIT (Estimation of Signal Parameters via Rational Invariance Techniques). While the deterministic methods are computationally efficient, their localization performance is significantly poorer than the statistical methods and requires far more frequency scanning points and higher dimensional MIMO elements to obtain comparable performance. On the other hand, the statistical methods are computationally bit expensive, but they are capable of providing far superior performance with fewer dimensional elements. Among MUSIC and ESPRIT based approaches, in general, ESPRIT has an advantage, as it is a search-free technique that avoids multidimensional search and moreover has the capability to localize multiple targets simultaneously. However, trivially extending the existing ESPRIT approach only on the spatial MIMO elements in the context of SFCW MIMO radar will not yield many benefits as the performance would be restricted by geometry of spatial MIMO. Moreover, in case of SFCW MIMO radars, the scanning happens at uniformly spaced frequency points that leads to frequency diversity in addition to spatial MIMO diversity which makes it difficult to apply the conventional ESPRIT approach directly.

SUMMARY

Embodiments of the present disclosure present technological improvements as solutions to one or more of the above-mentioned technical problems recognized by the inventors in conventional systems. For example, in one embodiment, a method for localization of targets using Stepped Frequency Continuous Wave Multi-Input Multi-Output (SFCW MIMO) radar is provided. The method includes receiving a channel impulse response H(m) captured by a Stepped Frequency Continuous Wave Multi-Input Multi-Output (SFCW MIMO) radar and computing a covariance matrix $R_{SF}$ from the channel impulse response. Further, the method includes performing eigen value decomposition of the covariance matrix to obtain a signal subspace matrix $U_s$ comprising eigen vectors corresponding to a pre-defined number of largest eigen values of the covariance matrix. The method further includes constructing a pre-defined number ($N_\mu$) of sets of transformation matrices. Each set of transformation matrices comprise a left transformation matrix $$\beta_{left}^\mu$$

and a right transformation matrix $$\beta_{right}^\mu$$

computed based on a first identity matrix $\overline{I_{N_f}}$ with its first diagonal element as 0, a second identity matrix $\underline{I_{N_f}}$ with its last diagonal element as 0 and a binary matrix $J_\mu$ with only the element at (μ, μ) as 1 and rest of the elements as 0. Further, the method includes computing a plurality of transformed signal subspace matrices $\phi^\mu$ based on the sets of transformation matrices and the signal subspace matrix, calculating a sum of the plurality of signal-subspaced transformational matrices, and performing eigen value decomposition on the sum to obtain a rotational signal-subspaced transformational matrix $T_R$. Furthermore, the method includes determining a parameter matrix $\Omega^\mu$ from the rotational signal-subspaced transformational matrix and estimating azimuth angle, elevation angle and range of each of the plurality of targets from the parameter matrix to localize the plurality of targets.

In another aspect, a system for localization of targets using SFCW MIMO radar is provided. The system includes: a memory storing instructions; one or more communication interfaces; one or more hardware processors coupled to the memory via the one or more communication interfaces; and a SFCW MIMO radar coupled to the one or more hardware processors, wherein the one or more hardware processors are configured by the instructions to: receive a channel impulse response H(m) captured by a Stepped Frequency Continuous Wave Multi-Input Multi-Output (SFCW MIMO) radar and computing a covariance matrix $R_{SF}$ from the channel impulse response. Further, the one or more hardware processors are configured to perform eigen value decomposition of the covariance matrix to obtain a signal subspace matrix $U_s$ comprising eigen vectors corresponding to a pre-defined number of largest eigen values of the covariance matrix. The one or more hardware processors are further configured to construct a pre-defined number ($N_\mu$) of sets of transformation matrices. Each set of transformation matrices comprise a left transformation matrix $$\beta^\mu_{left}$$

and a right transformation matrix $\beta_{right}^\mu$ computed based on a first identity matrix $\overline{I_{N_f}}$ with its first diagonal element as 0, a second identity matrix $\overline{IN}$, with its last diagonal element as 0 and a binary matrix $J_\mu$ with only the element at ($\mu$, $\mu$) as 1 and rest of the elements as 0. Further, the one or more hardware processors are configured to compute a plurality of transformed signal subspace matrices $\phi^\mu$ based on the sets of transformation matrices and the signal subspace matrix, calculate a sum of the plurality of signal-subspaced transformational matrices and perform eigen value decomposition on the sum to obtain a rotational signal-subspaced transformational matrix $T_R$. Furthermore, the one or more hardware processors are configured to determine a parameter matrix Qu from the rotational signal-subspaced transformational matrix and estimate azimuth angle, elevation angle and range of each of the plurality of targets from the parameter matrix to localize the plurality of targets.

In yet another aspect, there are provided one or more non-transitory machine-readable information storage mediums comprising one or more instructions which when executed by one or more hardware processors cause a method for localization of targets using SFCW MIMO radar. The method includes receiving a channel impulse response H(m) captured by a Stepped Frequency Continuous Wave Multi-Input Multi-Output (SFCW MIMO) radar and computing a covariance matrix $R_{SF}$ from the channel impulse response. Further, the method includes performing eigen value decomposition of the covariance matrix to obtain a signal subspace matrix $U_s$ comprising eigen vectors corresponding to a pre-defined number of largest eigen values of the covariance matrix. The method further includes constructing a pre-defined number ($N_\mu$) of sets of transformation matrices. Each set of transformation matrices comprise a left transformation matrix $$\beta^\mu_{left}$$

and a right transformation matrix $$\beta^\mu_{right}$$

computed based on a first identity matrix $\overline{I_{N_f}}$ with its first diagonal element as 0, a second identity matrix $I_{N_f}$ with its last diagonal element as 0 and a binary matrix $J_\mu$ with only the element at ($\mu$, $\mu$) as 1 and rest of the elements as 0. Further, the method includes computing a plurality of transformed signal subspace matrices $\phi^\mu$ based on the sets of transformation matrices and the signal subspace matrix, calculating a sum of the plurality of signal-subspaced transformational matrices, and performing eigen value decomposition on the sum to obtain a rotational signal-subspaced transformational matrix $T_R$. Furthermore, the method includes determining a parameter matrix $\Omega^\mu$ from the rotational signal-subspaced transformational matrix and estimating azimuth angle, elevation angle and range of each of the plurality of targets from the parameter matrix to localize the plurality of targets.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Figure 4:
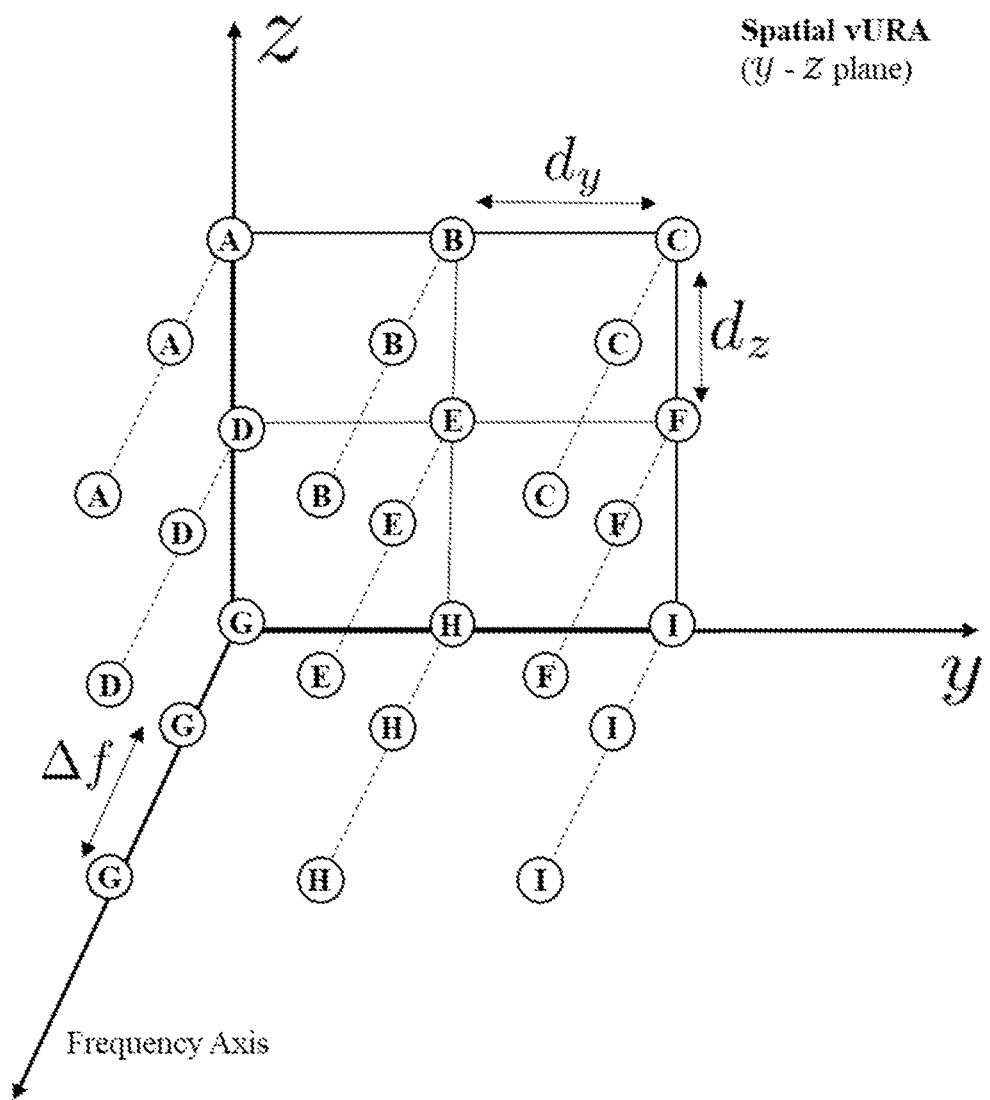
FIG. 4 is an example of a 3-dimensional (3D) space-frequency (SF) array with spatial elements of the SFCW MIMO radar along $\mathcal{Y} - \mathcal{Z}$ dimension and frequency points along the third dimension, according to some embodiments of the present disclosure.

Conventionally, statistical methods are more advantageous than deterministic methods for 3D localization of targets. Among the statistical methods, ESPRIT (Estimation of Signal Parameters via Rational Invariance Techniques) is best suited for this application. However, conventional ESPRIT cannot be directly applied to Stepped Frequency Continuous Wave Multi-Input Multi-Output (SFCW MIMO) radar as the performance would be restricted by geometry of spatial MIMO. Thus, the method and system of the present disclosure uses the spatial MIMO together with stepped frequency scanning for efficient 3D localization with SFCW MIMO radars. The SFCW MIMO radar comprises a uniform linear transmitter array and receiver array of dimensions $N_y$ and $N_z$ respectively that are orthogonally arranged as illustrated in the example of FIG. 4. Such a structure gives rise to a virtual Uniform Rectangular Array (vURA) of dimension $N_y \times N_z$. It is important to note that such devices (SFCW MIMO radars) are commercially available and are successfully used in several applications. These devices provide the channel response corresponding to each frequency scanning point and at each array element of a vURA. The method of present disclosure combines all these channel responses to form a larger multi-dimensional array called space-frequency (SF) array. Unlike any multidimensional uniform array, the phase relationships of this SF-array is complex and hence standard ESPRIT approach cannot be directly applied. The method of present disclosure estimates the 3D localization parameters of multiple targets from the SF array by using various transformation matrices. The number of resolvable targets with the method of present disclosure largely depends upon the number of frequency scanning points. In addition, most importantly the inter-element spacing of MIMO elements will no more be restricted by the wavelength of the carrier frequency and depends upon the wavelength of the frequency scanning interval whose wavelength will be much larger. This relaxation in inter-element distance helps to overcome some of the ill effects like mutual coupling etc. The aforementioned advantages translates to obtaining better performance with a smaller dimensional array.

Referring now to the drawings, and more particularly to FIGS. 1 to 7B, where similar reference characters denote corresponding features consistently throughout the figures, there are shown preferred embodiments and these embodiments are described in the context of the following exemplary system and/or method.

Figure 1:
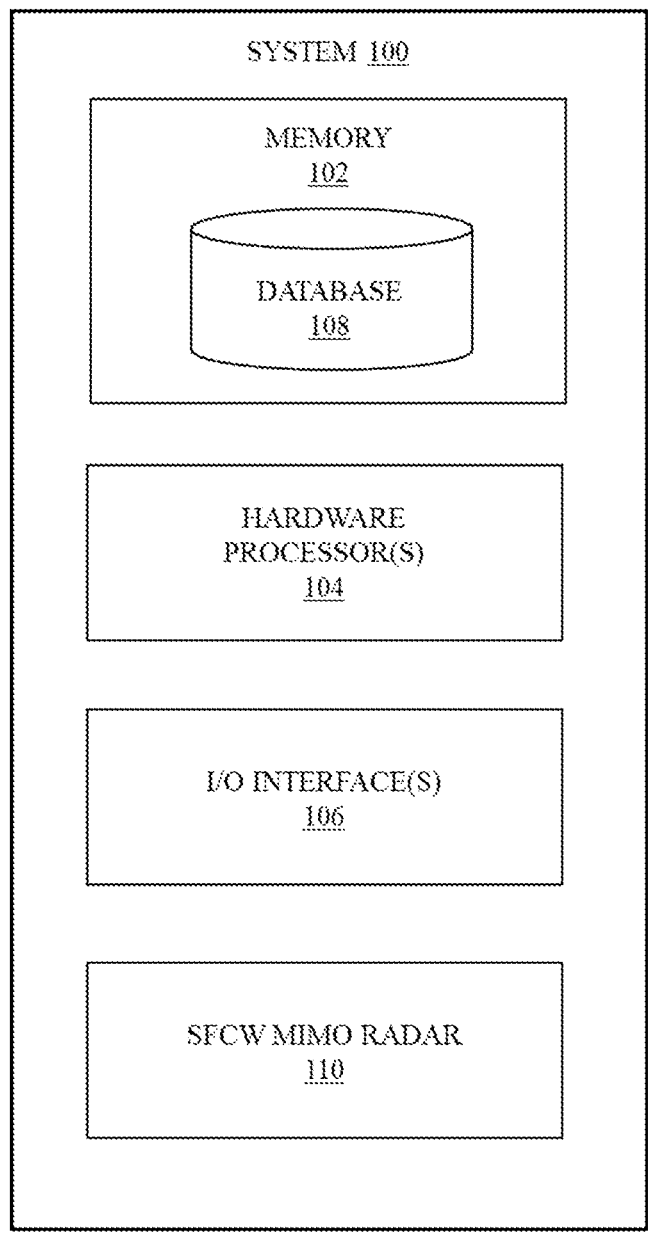
FIG. 1 illustrates an exemplary block diagram of a system for localization of targets using Stepped Frequency Continuous Wave Multi-Input Multi-Output (SFCW MIMO) radar, according to some embodiments of the present disclosure.

FIG. 1 illustrates an exemplary block diagram of a system 100 for localization of targets using SFCW MIMO radar. In an embodiment, the system 100 includes one or more processors 104, communication interface device(s) 106 or Input/Output (I/O) interface(s) 106 or user interface 106, one or more data storage devices or memory 102 operatively coupled to the one or more processors 104 and one or more SFCW MIMO radars 110 coupled to the one or more hardware processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) 106 displays the 3D location of the targets. The memory 102 may include any computer-readable medium known in the art including, for example, volatile memory, such as Static Random-Access Memory (SRAM) and Dynamic Random-Access Memory (DRAM), and/or non-volatile memory, such as read only memory (ROM), erasable programmable ROM, flash memories, hard disks, optical disks, and magnetic tapes. The database 108 may store information but not limited to information associated with at least one of: data received from the SFCW MIMO radar, matrices computed in intermediary steps of processing the data received from the SFCW MIMO radar and so on. Further, the database 108 stores information pertaining to inputs fed to the system 100 and/or outputs generated by the system (e.g., at each stage), specific to the methodology described herein. Functions of the components of system 100 are explained in conjunction with flow diagram depicted in FIGS. 2 and 3, an example SF array configuration of FIG. 4 and experimental results illustrated in FIGS. 5 to 7B for localization of targets using SFCW MIMO radar.

Figure 2A:
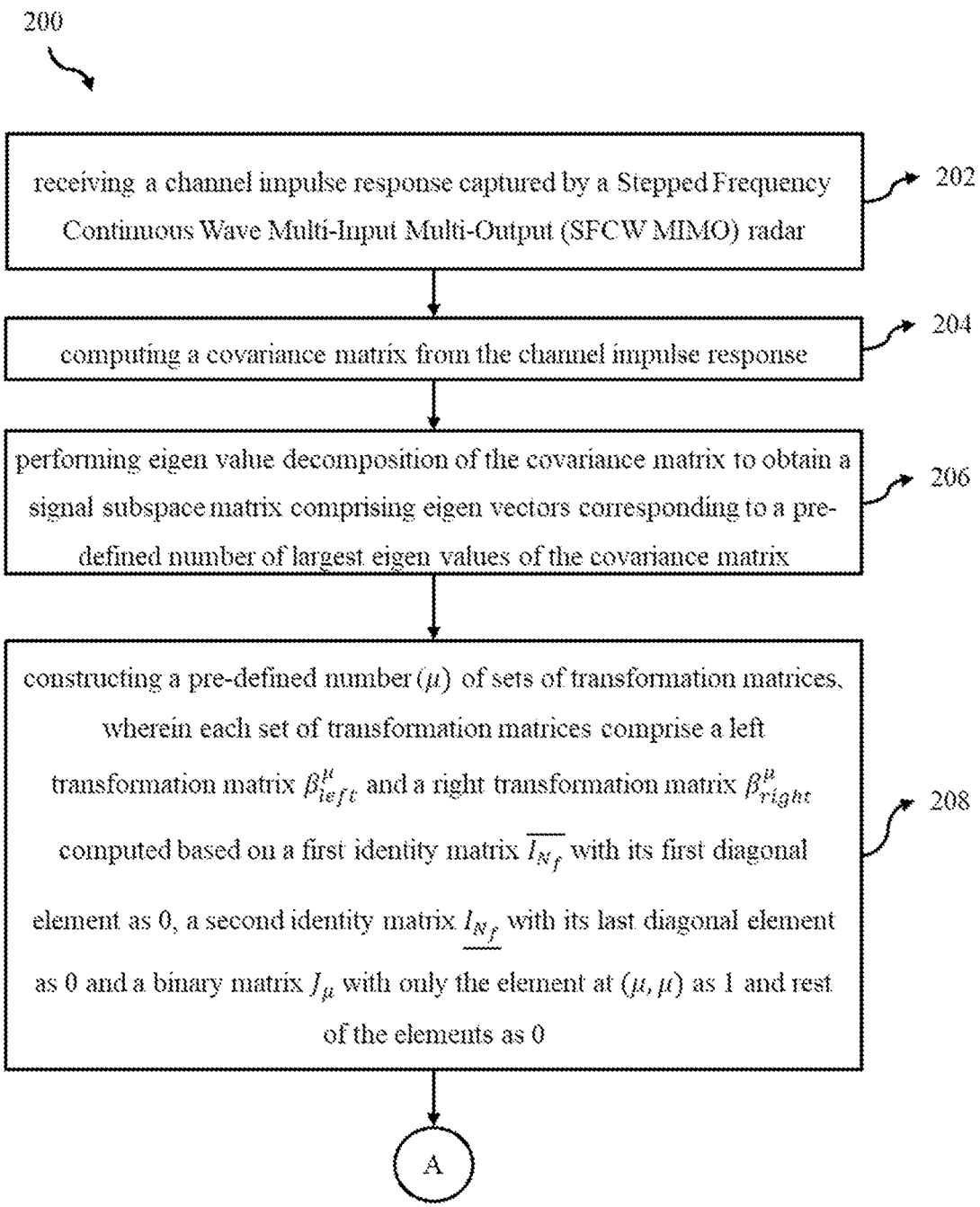
FIGS. 2A and 2B, collectively referred as FIG. 2, illustrate a flow diagram of a method for localization of targets using SFCW MIMO radar, according to some embodiments of the present disclosure.
Figure 2B:
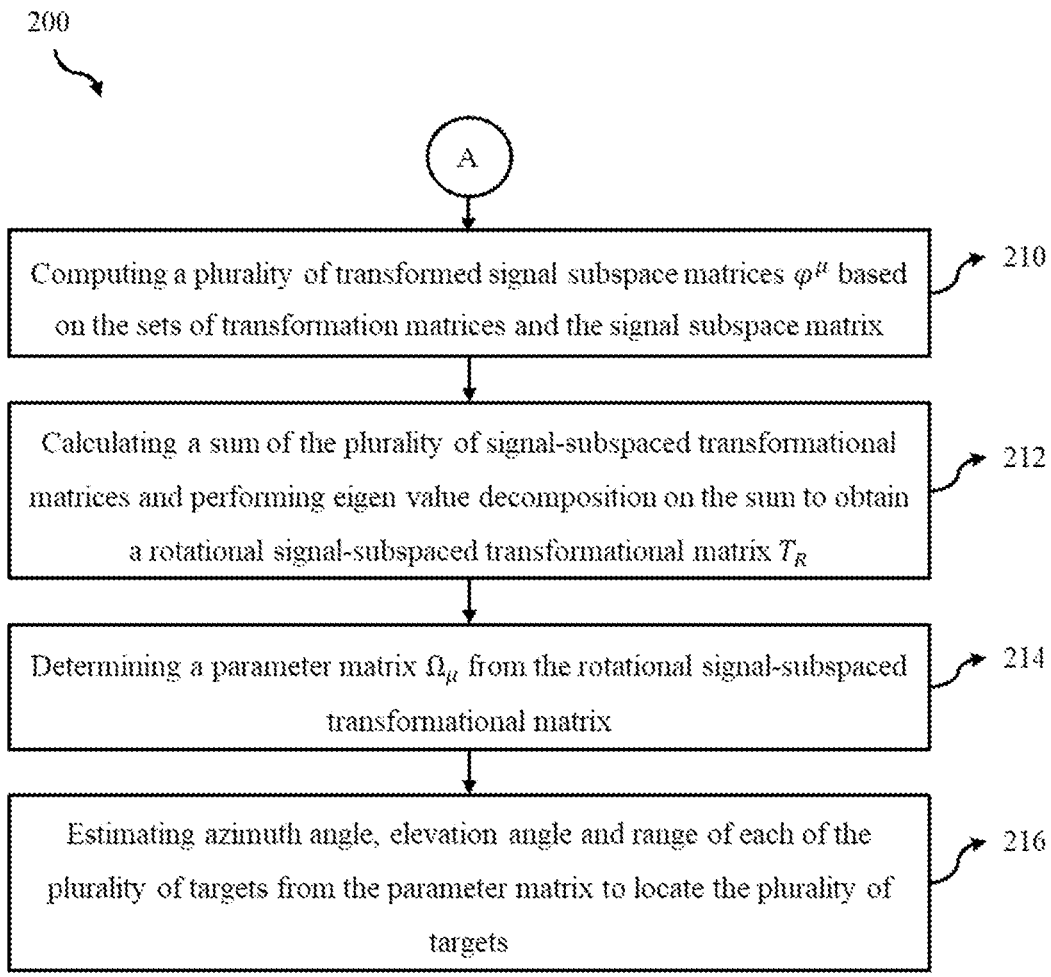
Figure 3:
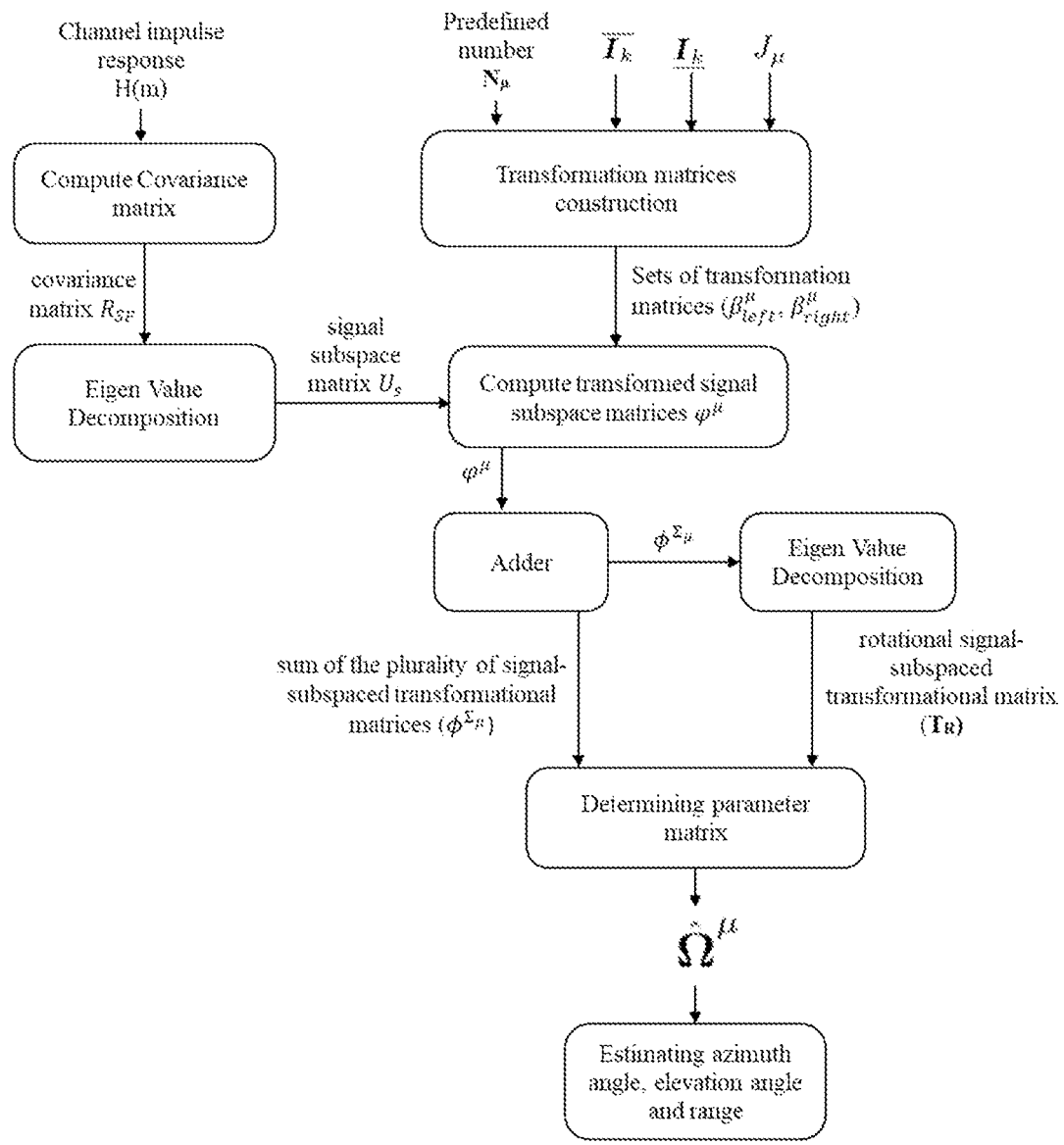
FIG. 3 is an alternate representation of the flow diagram illustrated in FIG. 2, according to some embodiments of the present disclosure.

In an embodiment, the system 100 comprises one or more data storage devices or the memory 102 operatively coupled to the processor(s) 104 and is configured to store instructions for execution of steps of the method depicted in FIGS. 2 and 3 by the processor(s) or one or more hardware processors 104. The steps of the method of the present disclosure will now be explained with reference to the components or blocks of the system 100 as depicted in FIG. 1, the steps of flow diagrams depicted in FIGS. 2 and 3, and the example SF array configuration depicted in FIG. 4. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

FIGS. 2A and 2B, collectively referred as FIG. 2, illustrate a flow diagram of a method 200 for localization of targets using SFCW MIMO radar and FIG. 3 is an alternate representation of the flow diagram illustrated in FIG. 2, according to some embodiments of the present disclosure. At step 202 of the method 200, the one or more hardware processors 104 are configured to receive a channel impulse response H(m) captured by a Stepped Frequency Continuous Wave Multi-Input Multi-Output (SFCW MIMO) radar (alternatively referred as MIMO SFCW radar or simply radar in this context). The radar comprises a uniform linear transmitter array and receiver array of dimensions $N_y$ and $N_z$ respectively that are orthogonally arranged as illustrated in the example of FIG. 4. Such a structure gives rise to a virtual Uniform Rectangular Array (vURA) of dimension $N_y \times N_z$. An example SFCW MIMO radar is imagevk-74 from Vayyar Inc. The radar is capable of capturing the channel frequency response ($S_{11}$ parameter) between each transmit-receive pair by transmitting equally spaced frequencies. As understood by a person skilled in the art, the radar performs scanning by transmitting and receiving signals at pre-configured time intervals. H(m) represents the channel impulse response captured at $m^{th}$ time interval (also referred as $m^{th}$ snapshot). Let $f_n$ denote the $n^{th}$ frequency point which can be expressed as in equation 1, wherein $f_0$ and $\Delta f$ denotes lowest transmitted frequency and the frequency scanning interval respectively, n=0, 1, 2, ..., $N_f$–1, $N_f$ denotes the number of frequency scanning points.

$$f_n = f_0 + n\Delta f \quad (1)$$

The vURA is placed along the $\mathcal{Y}-\mathcal{Z}$ plane with its location given by $S_{y,z}=S_y\times S_z$, $S_y=\{d_y n_y | 0\leq n_y \leq N_y-1\}$, $S_z=\{d_z n_z | 0\leq n_z \leq N_z-1\}$. $d_y$ and $d_z$ denotes inter-element distance of the vURA along the $\mathcal{Y}$-axis and $\mathcal{Z}$-axis, respectively. Thus, the frequency response at a frequency point $f_n$ of an antenna located at some coordinate $s_{y,z}\in S_{y,z}$ can be expressed as in equation 2, where gum denotes reflectivity coefficient corresponding to $l^{th}$ target, l={0, 1, 2, ..., L–1} at $m^{th}$ snapshot, $\theta_l$, $\phi_l$, $R_l$ denote azimuth angle, elevation angle and range of the $l^{th}$ target respectively. $a_{y,z}(\theta_l, \phi_l, f_n, R_l)$ denotes stepped frequency steering vector which can be expressed according to equation 3, wherein $\Delta_{y,z}$ is the inter-element time delay, $2R_l/c$ denotes round trip time delay with respect to a reference element of the vURA of a target residing at the range $R_l$ and c denotes the speed of light.

$$H_{f_n, s_{y,z}}(m) = \sum_{l=0}^{L-1} g_{l,m} a_{y,z}(\theta_l, \phi_l, f_n, R_l) + n_{y,z}(m) \quad (2)$$

$$a_{y,z}(\theta_l, \phi_l, f_n, R_l) = e^{-j2\pi f_n \Delta_{y,z}} e^{-j2\pi f_n (2R_l/c)} \quad (3)$$

Equation 2 provides the frequency response at a frequency point $f_n$ for a vURA element located at some coordinate $s_{y,z}\in S_{y,z}$. By combining the frequency response for all $N_f$ frequency points and all the $N_y N_z$ spatial elements, the channel impulse response is determined as given by equation 4. Here, $$\{f_n\}_{n=0}^{N_f-1}$$

are frequencies at the frequency points of the SFCW MIMO radar, $\theta_l$, $\varnothing_l$, $R_l$ are azimuth angle, elevation angle and range of $l^{th}$ target respectively, $g_{l,m}$ denotes reflectivity coefficient corresponding to $l^{th}$ target and n(m) is noise of the $m^{th}$ snapshot. For any n and l (0≤n≤$N_f$–1, 0≤l≤L–1), $a_{y,z(f_n,\theta_l,\varnothing_l,R_l)}$ is given by equation 5.

(4)

$$H(m) = \begin{pmatrix} a_{y,z(f_0,\theta_0,\varnothing_0,R_0)} & \cdots & a_{y,z(f_0,\theta_{L-1},\varnothing_{L-1},R_{L-1})} \\ a_{y,z(f_1,\theta_0,\varnothing_0,R_0)} & \cdots & a_{y,z(f_1,\theta_{L-1},\varnothing_{L-1},R_{L-1})} \\ \vdots & \ddots & \vdots \\ a_{y,z(f_{N_f-1},\theta_0,\varnothing_0,R_0)} & \cdots & a_{y,z(f_{N_f-1},\theta_{L-1},\varnothing_{L-1},R_{L-1})} \end{pmatrix} \times \begin{pmatrix} g_{0,m} \\ g_{1,m} \\ \vdots \\ g_{L-1,m} \end{pmatrix} + n(m) \Rightarrow$$

$$H(m) = A_{SF} \times G + n(m)$$

$$a_{y,z(f_n,\theta_i,\varnothing_i,R_i)} = \begin{pmatrix} e^{-j\omega f_n \alpha_i^1} \\ e^{-j\omega f_n \alpha_i^2} \\ \vdots \\ e^{-j\omega f_n \alpha_i^{N_y N_z}} \end{pmatrix} \quad (5)$$

The matrix $A_{SF}$ of equation 4 has a dimension of $N_f N_y N_z \times$ L. It comprises of all equally spaced scanning frequencies and all elements of vURA that resembles the steering matrix of an array referred as the SF array. As depicted in FIG. 4, SF array can be visualized as a 3D array with spatial elements (A, B, C, ..., I) along $\mathcal{Y}-\mathcal{Z}$ dimension and frequency points along the third dimension. In FIG. 4, the points with same letters indicate that there is phase relation between them. However, the phase relation is not direct unlike a uniform cubic array. Thus, standard ESPRIT cannot be directly applied onto this SF array. Hence, the channel impulse response is processed using steps 204-214 of the method 200 to localize the plurality of targets.

At step 204 of the method 200, a covariance matrix is computed from the channel impulse response according to equation 6, wherein $(.)\mathcal{H}$ denotes Hermitian operation. The covariance matrix $R_{SF}$ is of dimension $N_f N_y N_z \times N_f N_y N_z$.

$$R_{SF} = \frac{1}{M} \sum_{m=0}^{M-1} H(m) H(m)^H \quad (6)$$

Further, at step 206 of the method 200, the one or more hardware processors 104 are configured to perform eigen value decomposition of the covariance matrix to obtain a signal subspace matrix $U_s$ comprising eigen vectors corresponding to a pre-defined number (L) of largest eigen values of the covariance matrix. In a noise-free setting where it is assumed that there is no background noise while capturing the channel impulse response, it can easily be shown that $U_s$ and $A_{SF}$ spans the same subspace and hence $A_{SF}=U_s T_R$ where $T_R$ denotes a full rank transformation matrix of size L×L. Thus, at step 208 of the method 200, the one or more hardware processors 104 are configured to construct a pre-defined number ($N_\mu$) of sets of transformation matrices. Each set of transformation matrices comprise a left transformation matrix $$\beta_{left}^\mu$$

and a right transformation matrix $$\beta_{right}^\mu$$

computed based on a first identity matrix $\overline{I_{N_f}}$ a second identity matrix $\underline{I_{N_f}}$ and a binary matrix $J_\mu$. The left transformation matrix $$\beta_{left}^\mu$$

is calculated by equation 7, and the right transformation matrix $$\beta_{right}^\mu$$

is calculated by equation 8. The first identity matrix is an identity matrix of order $N_f$ with its first diagonal element as 0 i.e. $[\overline{I_{N_f}}]_{1,1}=0$. The second identity matrix is an identity matrix of order $N_f$ with its last diagonal element as 0 i.e. $[\underline{I_{N_f}}]_{N_f,N_f}=0$. The binary matrix is of dimension $N_y N_z \times N_y N_z$ with only the element at (μ, μ) as 1 and rest of the elements as 0. In the equations 7 and 8, ⊗ denotes Kronecker product. The relationship between the transformation matrices is established by equation 9.

$$\beta_{left}^{\mu} = \overline{I_{N_f}} \otimes J_{\mu} \quad (7)$$

$$\beta_{right}^{\mu} = \underline{I_{N_f}} \otimes J_{\mu} \quad (8)$$

$$\beta_{left}^{\mu} A_{SF} = \beta_{right}^{\mu} A_{SF} \begin{pmatrix} e^{j\omega\Delta f\alpha_1^{\mu}} & 0 & \cdots & 0 \\ 0 & e^{j\omega\Delta f\alpha_2^{\mu}} & \ddots & 0 \\ 0 & 0 & \cdots & e^{j\omega\Delta f\alpha_L^{\mu}} \end{pmatrix} \quad (9)$$

Once the sets of transformation matrices are constructed, at step 210 of the method 200, a plurality of transformed signal subspace matrices $\phi^{\mu}$ are computed based on the sets of transformation matrices and the signal subspace matrix $U_s$ according to equation 10 which is obtained by substituting $A_{SF} = U_S T_R$ in equation 9 and simplifying.

$$\phi^{\mu} = \left(\beta_{right}^{\mu} U_s\right)^{\dagger} \beta_{left}^{\mu} U_s = T_R \Omega^{\mu} T_R^{-1} \quad (10)$$

From the equation 10 it is clearly evident that $\phi^{\mu}$ and $\Omega^{\mu}$ are similarity matrices and hence the eigenvalues are identical. In other words, the eigenvalues of $\phi^{\mu}$ are nothing but diagonal elements of $\Omega^{\mu}$. For any target l, its location $\alpha_l^{\mu}$ is a function of the triple ($\theta_l$, $\phi_l$, $R_l$) and hence at least three equations for different values of u are required to obtain the $\theta_l$, $\phi_l$ and $R_l$ separately. However, estimating in such a manner leads to ambiguity in a multi-target scenario and difficult to resolve. Thus, to overcome this difficulty and estimate the parameters jointly, at step 212 of the method 200, a sum of the plurality of signal-subspaced transformational matrices is calculated by equation 11 and eigen value decomposition is performed on the sum to obtain a rotational signal-subspaced transformational matrix $T_R$. In equation 11, $N_{\mu}$ is a pre-defined number based on user's choice in the range $3 \leq N_{\mu} \leq N_y N_z$. Minimum value of $N_{\mu}$ is 3 since there are 3 localization parameters to be estimated (i.e. azimuth angle, elevation angle and range).

$$\phi^{\Sigma\mu} = \sum_{\mu=1}^{N_{\mu}} \phi^{\mu} = T_R \left(\sum_{\mu=1}^{N_{\mu}} \Omega^{\mu}\right) T_R^{-1} \quad (11)$$

Further, at step 214 of the method 200, a parameter matrix $\Omega^{\mu}$ is determined from the rotational signal-subspaced transformational matrix $T_R$ according to equation 12. Furthermore, at step 216 of the method 200, azimuth angle, elevation angle and range of each of the plurality of targets are estimated from the parameter matrix, using any state of the art optimization techniques such as non-linear least squares, to localize the plurality of targets.

$$\bar{\Omega}_{\mu} = T_R^{-1} \Omega^{\mu} T_R, \mu = 1, 2, \ldots, N_{\mu} \quad (12)$$

Unlike the standard beamforming or MUSIC algorithm, the method 200 is a search free unambiguous method. In other words, it estimates the localization parameters ($\theta_l$, $\phi_l$, $R_l$) jointly and simultaneously for all the plurality of targets. Further, the target localization capability largely depends upon the number of frequency scanning points $N_f$ and only requires dimension of vURA>3. Usually in commercial SFCW MIMO radars, the number of frequency scanning points $N_f$ is a programmable parameter that can be chosen dynamically. Thus, the method 200 provides the flexibility to fix the vURA and adjust the localization capability by suitably choosing $N_f$ based on some prior knowledge of the scene in which the targets are located. Another important point to notice is that the inter-element distance is greatly relaxed to $d_y$, $d_z < \lambda_A/2$ unlike the usual requirement with existing algorithms such as beamforming, standard ESPRIT etc., which requires $d_y$, $d_z < \lambda_{N_f}/2$ ($\lambda_{N_f} = c/f_{N_f}$). In all mmWave radars, $f_{N_f}$ will be in several GHz, whereas $f_{\Delta f}$ will be in the range of several MHz. This indicates that with the method 200, one can construct a vURA with a larger aperture and obtain improved performance by increasing only the inter-element distance and not by increasing number of elements. The simulation results corroborates these observations. Further, it is important to note that increasing the inter-element distance helps in the overcoming the ill effects such as mutual coupling.

Simulation Results

Simulations were performed using the SFCW MIMO radar to assess the performance of the method 200. In all the simulations a bandwidth of 7 GHz ranging from 62-69 GHz is assumed. The SFCW MIMO radar comprises of uniform linear array of transmitters and receivers arranged orthogonally which bestows a vURA.

A. Target Resolution Capability

Figure 5:
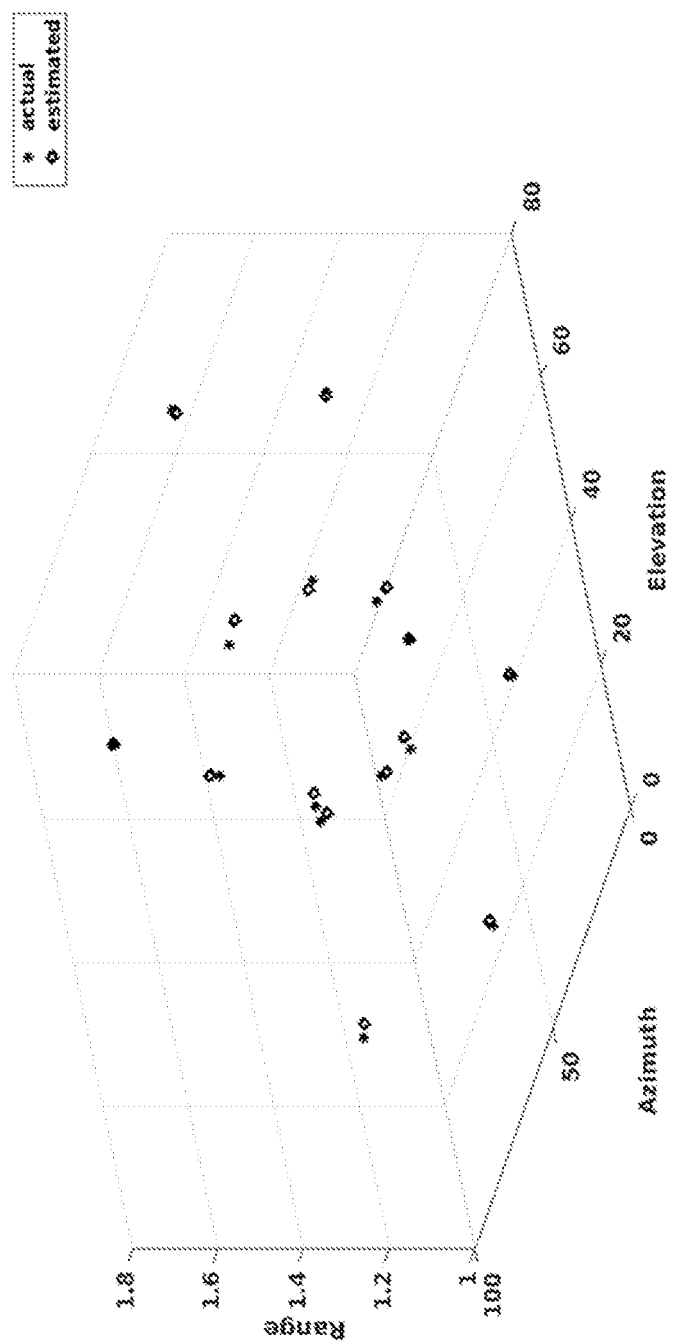
FIG. 5 illustrates actual and estimated 3D locations of 15 targets, according to some embodiments of the present disclosure.

For this simulation, a relatively high signal to noise ratio (SNR) of around 30 dB is chosen and the number of targets L is 15. The vURA dimension is $N_y = N_z = 3$ and $N_f = 50$. FIG. 5 shows the 3D scatter plot of azimuth vs elevation vs range. It provides both the actual and estimated locations with method 200. From the FIG. 5 it can be seen that all the targets are localized with very less error. Presence of noise affects the estimation and hence a small perturbation can be observed at some targets. It is important to note that all the existing algorithms such as standard beamforming, standard ESPRIT etc., fails when $L > N_y N_z$. Despite the dimension of vURA being only 9, the method 200 is able to localize all the 15 targets.

B. Effect of vURA Geometry

Figure 6A:
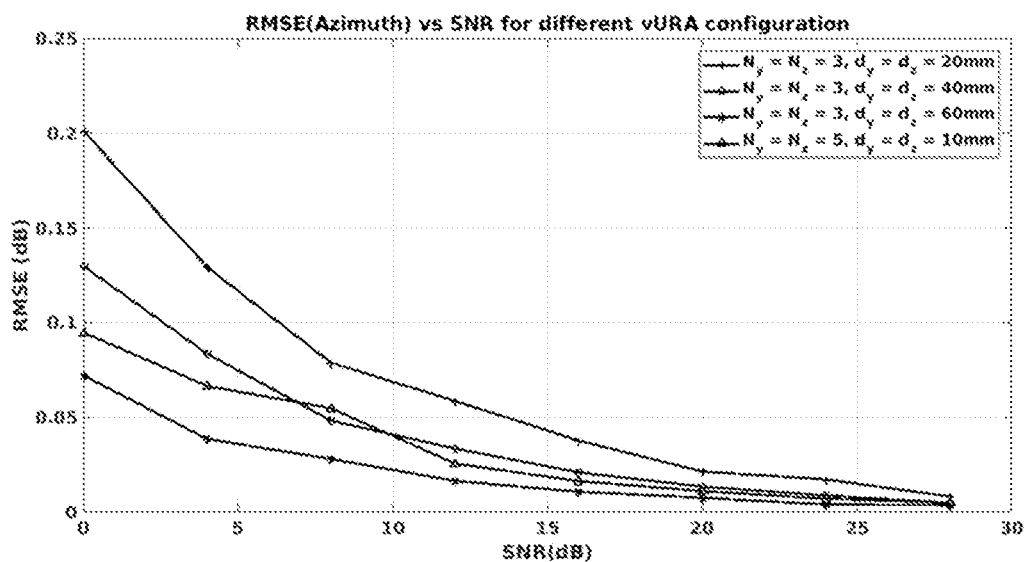
FIGS. 6A and 6B depict RMSE (Root Mean Square Error) performance plot vs SNR (Signal to Noise Ratio) for various vURA (virtual Uniform Rectangular Array) configuration of the SFCW MIMO radar at azimuth and elevation respectively, according to some embodiments of the present disclosure.
Figure 6B:
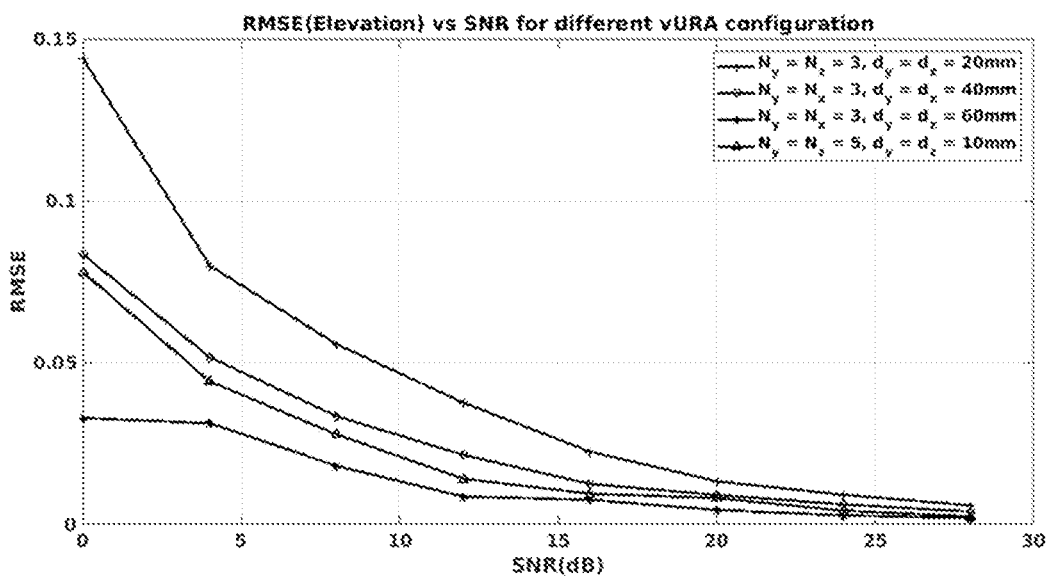

Next, simulations are conducted to study the effect of vURA geometry on the localization performance. For this simulation, the number of scanning frequency points $N_f$ is fixed to be 50 and number of targets L=5. The dimension and the interelement distance was varied during this simulation. FIGS. 6A and 6B illustrate the root mean squared error (RMSE) performance plots with varying SNRs for different vURA configuration. The dimensions and the inter-element separation of vURA is also indicated in the figures. While only the RMSE performance of Azimuth vs SNR and Elevation vs SNR are provided, a similar trend is observed in the range performance. The simulations were conducted by fixing the dimension of vURA to $N_y = N_z = 3$ and for three different inter-element distances. From the plots in FIGS. 6A and 6B it can be noticed that along the expected lines as the inter-element distance increases, the performance improves which is due to increase in aperture with increase in the inter-element distance. A performance plot of 5×5 array with inter-element distance of 10 mm is also provided. The aperture of this larger dimensional array is similar to that of 3×3 with inter-element distance of 20 mm. Thus from the FIGS. 6A and 6B, it can be noticed that there is only a marginal improvement among these 2 arrays and unlike the other cases, the performance gap is not significant. This plot shows that one can obtain a better performance with only fewer elements and by appropriately choosing the interelement distance. It is important to note here that the interelement distances considered for this simulations exceeds the Nyquist criterion requirements. In other words, recall that we have considered the mmWave band from [62-69] GHz, for which the inter-element separation of the vURA should not exceed 2.17 mm, to avoid spatial aliasing. Despite the much larger inter-element separation, the method of present disclosure is able to perform well.

C. Effect of $N_f$

Figure 7A:
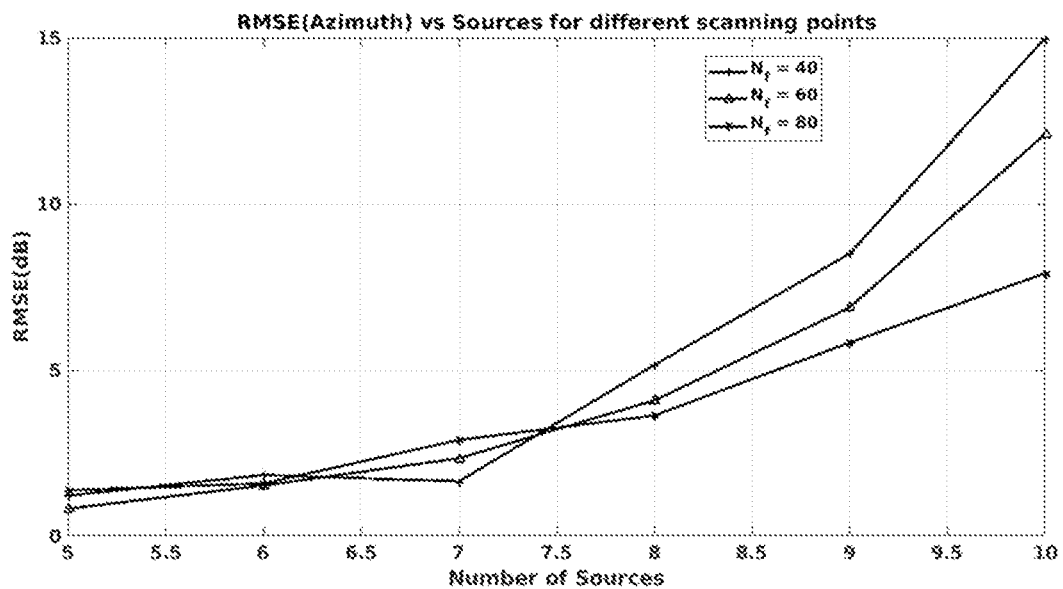
FIGS. 7A and 7B illustrate RMSE performance plot vs varying number of sources for various frequencies ($N_f$) with a vURA dimension of $N_y=N_z=3$, according to some embodiments of the present disclosure.
Figure 7B:
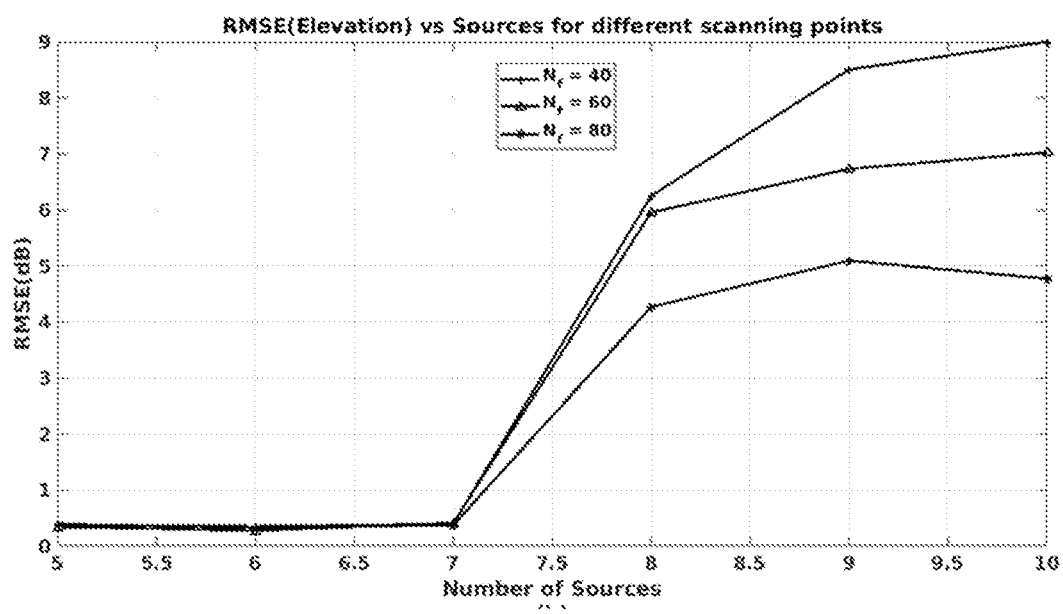

Next, simulations were conducted to study the effects of number of frequency scanning points $N_f$ on localization performance. For this simulation, the dimension of the vURA is fixed to be 3×3, the inter-element spacing is fixed to be 10 mm and the number of targets are varied. The SNR was also fixed at 10 dB. FIGS. 7A and 7B shows the performance plots of both the azimuth and elevation with varying number of sources and for different values of $N_f$. From the structure of $$\beta_{left}^\mu, \beta_{right}^\mu$$

and the equation 9, it can be noted that the number of equations increases by increasing $N_f$ and not the dimension of the vURA. Hence, in the presence of noise, as the number of equations increases, it leads to better estimation which can also be observed from the plots. While, at fewer sources, the effect of increasing $N_f$ is negligible, but for more sources, the effect becomes more clearly visible. Thus, it is clearly evident from FIGS. 6A, 6B, 7A and 7B that with the method 200, one can obtain a good performance by fixing the vURA dimension (with a suitable inter-element distance) and dynamically adjusting the values of $N_f$ based on the environment of the targets.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Thus, the method of present disclosure solves the unresolved problem of localizing a plurality of targets simultaneously using SFCW MIMO radar. A larger dimensional SF array is formed by combining the channel response of each element of vURA in the SFCW MIMO radar obtained via scanning uniformly spaced frequency points. Further, the localization parameters of the plurality of targets is estimated using this SF-array. Using the method of present disclosure, one can localize far more targets than the dimension of the vURA by only adjusting the number of scanning frequency points and with greatly relaxed inter-element spacing of vURA.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A process implemented method comprising:

receiving, via one or more hardware processors, a channel impulse response H(m) captured by a Stepped Frequency Continuous Wave Multi-Input Multi-Output (SFCW MIMO) radar comprises a uniform linear transmitter array and receiver array of dimensions $N_y$ and $N_z$ respectively that are orthogonally arranged, providing a virtual Uniform Rectangular Array (vURA) of dimension $N_y \times N_z$, wherein $d_y$ and $d_z$ denotes an inter-element distance of the vURA along y-axis and z-axis, respectively, wherein increasing the inter-element distance overcome effects of mutual coupling;

computing, via the one or more hardware processors, a covariance matrix $R_{SF}$ from the channel impulse response;

performing, via the one or more hardware processors, eigen value decomposition of the covariance matrix to obtain a signal subspace matrix $U_s$ comprising eigen vectors corresponding to a pre-defined number of largest eigen values of the covariance matrix;

constructing, via the one or more hardware processors, a pre-defined number ($N_\mu$) of sets of transformation matrices, wherein each set of transformation matrices comprise a left transformation matrix $$\beta_{left}^\mu$$

and a right transformation matrix $$\beta_{right}^\mu$$

computed based on a first identity matrix $\overline{I_{N_f}}$ with its first diagonal element as 0, a second identity matrix $\underline{I_{N_f}}$ with its last diagonal element as 0 and a binary matrix $J_\mu$ with only the element at (μ, μ) as 1 and rest of the elements as 0;

computing, via the one or more hardware processors, a plurality of transformed signal subspace matrices $\phi^\mu$ based on the sets of transformation matrices and the signal subspace matrix;

calculating, via the one or more hardware processors, a sum of the plurality of signal-subspaced transformational matrices and performing eigen value decomposition on the sum to obtain a rotational signal-subspaced transformational matrix $T_R$;

determining, via the one or more hardware processors, a parameter matrix $\Omega^\mu$ from the rotational signal-subspaced transformational matrix;

estimating, via the one or more hardware processors, azimuth angle, elevation angle and range of each of a plurality of targets from the parameter matrix to localize the plurality of targets; and dynamically adjusting only number of scanning frequency points $N_f$ and relaxing the inter-element distance of the vURA facilitates localizing the plurality of targets with a fixed dimension of the vURA.

2. The method of claim 1, wherein the channel impulse response (H(m)) is a space frequency array of signals reflected from a plurality of targets at $m^{th}$ snapshot calculated by the equation- $$H(m) = \begin{pmatrix} a_{y,z(f_0,\theta_0,\emptyset_0,R_0)} & \cdots & a_{y,z(f_0,\theta_{L-1},\emptyset_{L-1},R_{L-1})} \\ a_{y,z(f_1,\theta_0,\emptyset_0,R_0)} & \cdots & a_{y,z(f_1,\theta_{L-1},\emptyset_{L-1},R_{L-1})} \\ \vdots & \ddots & \vdots \\ a_{y,z(f_{N_f-1},\theta_0,\emptyset_0,R_0)} & \cdots & a_{y,z(f_{N_f-1},\theta_{L-1},\emptyset_{L-1},R_{L-1})} \end{pmatrix} \times \begin{pmatrix} g_{0,m} \\ g_{1,m} \\ \vdots \\ g_{L-1,m} \end{pmatrix} + n(m),$$

wherein $$\{f_n\}_{n=0}^{N_f-1}$$

are frequencies or antennas comprised in the SFCW MIMO radar, $\theta_l$, $\emptyset_l$, $R_l$ are azimuth angle, elevation angle and range of $l^{th}$ target respectively, $f_{l,m}$ denotes reflectivity coefficient corresponding to $l^{th}$ target and n(m) is noise of the $m^{th}$ snapshot.

3. The method of claim 1, wherein the left transformation matrix $$`\beta_{left}^\mu`$$

is calculated by the equation $$\beta_{left}^\mu = \overline{I_{N_f}} \otimes J_\mu,$$

wherein μ is a pre-defined number, $\overline{I_{N_f}}$ is the first identity matrix and $J_\mu$ is the binary matrix.

4. The method of claim 1, wherein the right transformation matrix $$`\beta_{right}^\mu`$$

is calculated by the equation $$\beta_{right}^\mu = \underline{I_{N_f}} \otimes J_\mu,$$

wherein μ is a pre-defined number, $\underline{I_{N_f}}$ is the second identity matrix and $J_\mu$ is the binary matrix.

5. The method of claim 1, wherein each of the plurality of transformed signal subspace matrices '$\phi^\mu$' is computed by the equation $$\phi^\mu = (\beta_{right}^\mu U_s)^\dagger \beta_{left}^\mu U_s,$$

wherein $U_s$ is the signal subspace matrix.

6. A system comprising:
a memory storing instructions;
one or more communication interfaces;
one or more hardware processors coupled to the memory via the one or more communication interfaces; and
a Stepped Frequency Continuous Wave Multiple-Input Multiple-Output (SFCW MIMO) radar coupled to the one or more hardware processors comprises a uniform linear transmitter array and receiver array of dimensions $N_y$ and $N_z$ respectively that are orthogonally arranged, providing a virtual Uniform Rectangular Array (vURA) of dimension $N_y \times N_z$, wherein $d_y$ and $d_z$ denotes an inter-element distance of the vURA along y-axis and Z-axis, respectively,
wherein increasing the inter-element distance overcome effects of mutual coupling, wherein the one or more hardware processors are configured by the instructions to:
receive a channel impulse response H(m) captured by the SFCW MIMO radar;
compute a covariance matrix $R_{SF}$ from the channel impulse response;
perform eigen value decomposition of the covariance matrix to obtain a signal subspace matrix $U_s$ comprising eigen vectors corresponding to a pre-defined number of largest eigen values of the covariance matrix;
construct a pre-defined number ($N_\mu$) of sets of transformation matrices, wherein each set of transformation matrices comprise a left transformation matrix $$\beta^\mu_{left}$$

and a right transformation matrix $$\beta^\mu_{right}$$

computed based on a first identity matrix $\overline{I_{N_f}}$ with its first diagonal element as 0, a secondary identity matrix $\underline{I_{N_f}}$ with its matrix $\overline{I_{N_f}}$ with its first diagonal element as 0, a second identity matrix $\underline{I_{N_f}}$ with its last diagonal element as 0 and a binary matrix $J_\mu$ with only the element at $(\mu, \mu)$ as 1 and rest of the elements as 0;
compute a plurality of transformed signal subspace matrices $\phi^\mu$ based on the sets of transformation matrices and the signal subspace matrix;
calculate a sum of the plurality of signal-subspaced transformational matrices and performing eigen value decomposition on the sum to obtain a rotational signal-subspaced transformational matrix $T_R$;
determine a parameter matrix $\Omega^\mu$ from the rotational signal-subspaced transformational matrix;
estimate azimuth angle, elevation angle and range of each of a plurality of targets from the parameter matrix to localize the plurality of targets; and
dynamically adjusting only number of scanning frequency points $N_f$ and relaxing the inter-element distance of the vURA facilitates localizing the plurality of targets with a fixed dimension of the vURA.

7. The system of claim 6, wherein the channel impulse response (H(m)) is a space frequency array of signals reflected from a plurality of targets at $m^{th}$ snapshot calculated by the equation- $$H(m) = \begin{pmatrix} a_{y,z}(f_0,\theta_0,\varnothing_0,R_0) & \cdots & a_{y,z}(f_0,\theta_{L-1},\varnothing_{L-1},R_{L-1}) \\ a_{y,z}(f_1,\theta_0,\varnothing_0,R_0) & \cdots & a_{y,z}(f_1,\theta_{L-1},\varnothing_{L-1},R_{L-1}) \\ \vdots & \ddots & \vdots \\ a_{y,z}(f_{N_f-1},\theta_0,\varnothing_0,R_0) & \cdots & a_{y,z}(f_{N_f-1},\theta_{L-1},\varnothing_{L-1},R_{L-1}) \end{pmatrix} \times \begin{pmatrix} g_{0,m} \\ g_{1,m} \\ \vdots \\ g_{L-1,m} \end{pmatrix} + n(m),$$

wherein $$\{f_n\}_{n=0}^{N_f-1}$$

are frequencies of antennas comprised in the SFCW MIMO radar, $\theta_l$, $\varnothing_l$, $R_l$ are azimuth angle, elevation angle and range of $l^{th}$ target respectively, $g_{l,m}$ denotes reflectivity coefficient corresponding to $l^{th}$ target and n(m) is noise of the $m^{th}$ snapshot.

8. The system of claim 6, wherein the left transformation matrix

'$\beta^\mu_{left}$' is calculated by the equation $$\beta^\mu_{left} = \overline{I_{N_f}} \otimes J_\mu,$$

wherein μ is a pre-defined number, $\overline{I_{N_f}}$ is the first identity matrix and $J_\mu$ is the binary matrix.

9. The system of claim 6, wherein the left transformation matrix

'$\beta^\mu_{right}$' is calculated by the equation $$\beta^\mu_{right} = \underline{I_{N_f}} \otimes J_\mu,$$

wherein μ is a pre-defined number, $\underline{I_{N_f}}$ is the second identity matrix and $J_\mu$ is the binary matrix.

10. The system of claim 6, wherein each of the plurality of transformed signal subspace matrices '$\phi^\mu$' is computed by the equation $$\phi^\mu = (\beta^\mu_{right} U_s)^\dagger \beta^\mu_{left} U_s,$$

wherein $U_s$ is the signal subspace matrix.

11. One or more non-transitory machine-readable information storage mediums comprising one or more instructions which when executed by one or more hardware processors cause:

receiving a channel impulse response H(m) captured by a Stepped Frequency Continuous Wave Multi-Input Multi-Output (SFCW MIMO) radar comprises a uniform linear transmitter array and receiver array of dimensions $N_y$ and $N_z$ respectively that are orthogonally arranged, providing a virtual Uniform Rectangular Array (vURA) of dimension $N_y \times N_z$, wherein $d_y$ and $d_z$ denotes an inter-element distance of the vURA along y-axis and z-axis, respectively, wherein increasing the inter-element distance overcome effects of mutual coupling;

computing a covariance matrix $R_{SF}$ from the channel impulse response;

performing eigen value decomposition of the covariance matrix to obtain a signal subspace matrix $U_s$ comprising eigen vectors corresponding to a pre-defined number of largest eigen values of the covariance matrix;

constructing a pre-defined number ($N_\mu$) of sets of transformation matrices, wherein each set of transformation matrices comprise a left transformation matrix and a right $$\beta_{left}^{\mu}$$

and a right transformation matrix $$\beta_{right}^{\mu}$$

computed based on a first identity matrix $\overline{I_{N_f}}$ with its first diagonal element as 0, a second identity matrix $\underline{I_{N_f}}$ with its last diagonal element as 0 and a binary matrix $J_\mu$ with only the element at $(\mu, \mu)$ as 1 and rest of the elements as 0;

computing a plurality of transformed signal subspace matrices $\phi^\mu$ based on the sets of transformation matrices and the signal subspace matrix;

calculating a sum of the plurality of signal-subspaced transformational matrices and performing eigen value decomposition on the sum to obtain a rotational signal-subspaced transformational matrix $T_R$;

determining a parameter matrix $\Omega^\mu$ from the rotational signal-subspaced transformational matrix;

estimating azimuth angle, elevation angle and range of each of a plurality of targets from the parameter matrix to localize the plurality of targets; and dynamically adjusting only number of scanning frequency points $N_f$ and relaxing the inter-element distance of the vURA facilitates localizing the plurality of targets with a fixed dimension of the vURA.

12. The one or more non-transitory machine-readable information storage mediums of claim 11, wherein the channel impulse response (H(m)) is a space frequency array of signals reflected from a plurality of targets at $m^{th}$ snapshot calculated by the equation- $$H(m) = \begin{pmatrix} a_{y,z}(f_0,\theta_0,\varnothing_0,R_0) & \cdots & a_{y,z}(f_0,\theta_{L-1},\varnothing_{L-1},R_{L-1}) \\ a_{y,z}(f_1,\theta_0,\varnothing_0,R_0) & \cdots & a_{y,z}(f_1,\theta_{L-1},\varnothing_{L-1},R_{L-1}) \\ \vdots & \ddots & \vdots \\ a_{y,z}(f_{N_f-1},\theta_0,\varnothing_0,R_0) & \cdots & a_{y,z}(f_{N_f-1},\theta_{L-1},\varnothing_{L-1},R_{L-1}) \end{pmatrix} \times \begin{pmatrix} g_{0,m} \\ g_{1,m} \\ \vdots \\ g_{L-1,m} \end{pmatrix} + n(m).$$

wherein $\{f_n\}_{n=0}^{N_f-1}$ are frequencies of antennas comprised in the SFCW MIMO radar, $\theta_l, \varnothing_l, R_l$ are azimuth angle, elevation angle and range of $l^{th}$ target respectively, $g_{l,m}$ denotes reflectivity coefficient corresponding to $l^{th}$ target and n(m) is noise of the $m^{th}$ snapshot.

13. The one or more non-transitory machine-readable information storage mediums of claim 11, wherein the left transformation matrix $$\beta_{left}^{\mu}$$

is calculated by the equation $$\beta_{left}^{\mu} = \overline{I_{N_f}} \otimes J_\mu,$$

wherein $\mu$ is a pre-defined number, $\overline{I_{N_f}}$ is the first identity matrix and $J_\mu$ is the binary matrix.

14. The one or more non-transitory machine-readable information storage mediums of claim 11, wherein the right transformation matrix $$\beta_{right}^{\mu}$$

is calculated by the equation $$\beta_{right}^{\mu} = \underline{I_{N_f}} \otimes J_\mu,$$

wherein $\mu$ is a pre-defined number, $\underline{I_{N_f}}$ is the second identity matrix and $J_\mu$ is the binary matrix.

15. The one or more non-transitory machine-readable information storage mediums of claim 11, wherein each of the plurality of transformed signal subspace matrices '$\phi^\mu$' is computed by the equation $$\phi^\mu = (\beta_{right}^{\mu} U_s)^\dagger \beta_{left}^{\mu} U_s,$$

wherein $U_s$ is the signal subspace matrix.

* * * * *